United States Patent
Lai et al.

(10) Patent No.: US 10,042,385 B2
(45) Date of Patent: Aug. 7, 2018

(54) FORCE DISPERSING DEVICE

(71) Applicant: Young Lighting Technology Inc., Hsin-Chu (TW)

(72) Inventors: Chih-Jen Lai, Hsin-Chu (TW); Bing-Han Tsai, Hsin-Chu (TW)

(73) Assignee: YOUNG LIGHTING TECHNOLOGY INC., Hsin-Chu (TW)

( * ) Notice: Subject to any disclaimer, the term of this patent is extended or adjusted under 35 U.S.C. 154(b) by 0 days.

(21) Appl. No.: 15/589,462

(22) Filed: May 8, 2017

(65) Prior Publication Data
US 2018/0129245 A1 May 10, 2018

(30) Foreign Application Priority Data
Nov. 10, 2016 (CN) .................. 2016 2 1210913 U (51) Int. Cl.
*G02F 1/1333* (2006.01)
*G06F 1/16* (2006.01)
(52) U.S. Cl.
CPC ...... *G06F 1/1601* (2013.01); *G02F 1/133308* (2013.01); *G02F 2001/133311* (2013.01)
(58) Field of Classification Search
CPC ......... G02F 1/133308; G02F 1/133311; G02F 1/133317
See application file for complete search history.

(56) References Cited

U.S. PATENT DOCUMENTS

| | | | | |
|---|---|---|---|---|
| 5,150,231 A | * | 9/1992 | Iwamoto | G02F 1/133308 349/122 |
| 5,583,681 A | * | 12/1996 | Shioya | G02F 1/133308 349/161 |
| 5,606,341 A | * | 2/1997 | Aguilera | F28D 15/0266 345/87 |
| 5,965,249 A | * | 10/1999 | Sutton | C08J 9/40 248/562 |
| 6,251,493 B1 | * | 6/2001 | Johnson | F16F 1/37 428/220 |
| 7,059,182 B1 | * | 6/2006 | Ragner | H05K 5/0086 73/200 |
| 7,095,943 B2 | * | 8/2006 | Emmons | G02B 5/045 362/602 |
| 7,218,831 B2 | * | 5/2007 | Pokorny | G02B 5/045 362/602 |

(Continued)

FOREIGN PATENT DOCUMENTS

| | | |
|---|---|---|
| CN | 201334183 Y | 10/2009 |
| CN | 101211198 B | 3/2011 |

(Continued)

*Primary Examiner* — Adrian S Wilson
(74) *Attorney, Agent, or Firm* — Muncy, Geissler, Olds & Lowe, P.C.

(57) ABSTRACT

One embodiment of the invention provides a force dispersing device for a display device. The display device has a casing, a backlight module and a display panel, the casing has a display opening, the backlight module is disposed in the display opening, and the display panel is disposed on the backlight module and in the display opening. The force dispersing device includes a fluid bag filled with a confined fluid and disposed between the casing and the backlight module.

10 Claims, 5 Drawing Sheets

(56) References Cited

U.S. PATENT DOCUMENTS

| | | | | |
|---|---|---|---|---|
| 8,144,453 B2 * | 3/2012 | Brown | G06F 3/0414 | 345/173 |
| 8,289,715 B2 * | 10/2012 | Takahara | H05K 7/2099 | 348/836 |
| 8,937,804 B2 * | 1/2015 | Tanaka | H05K 5/0017 | 361/679.21 |
| 8,976,517 B2 * | 3/2015 | Chen | H05K 5/0017 | 349/60 |
| 9,107,298 B2 * | 8/2015 | Prest | G11B 33/08 | |
| 9,129,659 B2 * | 9/2015 | Montevirgen | G11B 33/08 | |
| 9,571,150 B2 * | 2/2017 | Sanford | H04B 1/3888 | |
| 2003/0179543 A1 * | 9/2003 | Sri-Jayantha | G06F 1/1616 | 361/679.35 |
| 2004/0004680 A1 * | 1/2004 | Kim | G02F 1/133308 | 349/58 |
| 2007/0182877 A1 * | 8/2007 | Tanokuchi | H05K 5/02 | 349/58 |
| 2010/0265195 A1 * | 10/2010 | Watanabe | C09J 7/00 | 345/173 |
| 2011/0279961 A1 * | 11/2011 | Shedletsky | F16F 7/1028 | 361/679.21 |
| 2013/0027853 A1 * | 1/2013 | Chen | H05K 5/0017 | 361/679.01 |
| 2013/0063885 A1 * | 3/2013 | Shedletsky | F16F 7/1028 | 361/679.21 |
| 2013/0135877 A1 * | 5/2013 | Oh | G02F 1/133308 | 362/362 |
| 2014/0192495 A1 * | 7/2014 | Yajima | G06F 1/1637 | 361/752 |
| 2015/0116607 A1 * | 4/2015 | Cheng | H05K 5/02 | 349/12 |
| 2016/0282661 A1 * | 9/2016 | Nam | G02F 1/133305 | |

FOREIGN PATENT DOCUMENTS

| | | |
|---|---|---|
| CN | 205377949 U | 7/2016 |
| TW | I524113 B | 3/2016 |

* cited by examiner

FORCE DISPERSING DEVICE

CROSS-REFERENCE TO RELATED APPLICATION

This application claims the priority benefit of China application serial no. 201621210913.7 filed on Nov. 10, 2016. The entirety of the above-mentioned patent application is hereby incorporated by reference herein and made a part of this specification.

BACKGROUND OF THE INVENTION a. Field of the Invention

The invention relates to a force dispersing device.

b. Description of the Related Art

In typical product designs, internal components inside a product may suffer little or even no external forces to avoid damages by increasing the rigidity of outer components. For example, a selection of materials or supply of structural reinforcement may help to increase the rigidity. However, the increase in rigidity may correspondingly increase the volume and weight to frustrate the purpose of fabricating a light and thin product. Further, a bubble pack having multiple independent air cells often serves as a packaging buffer, and each cell may absorb external forces relying on material expendability and air compressibility. However, the air cells are separate from each other to hardly disperse force in different directions. Therefore, a bubble pack may function as a buffer but fail to effectively disperse forces imposed thereon.

Therefore, it is desirable to provide a force dispersing device to distribute external forces over a large area within a limited space to reduce the stress imposed on and thus prevent damages to internal components.

The information disclosed in this "BACKGROUND OF THE INVENTION" section is only for enhancement understanding of the background of the described technology, and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

BRIEF SUMMARY OF THE INVENTION

The invention provides a force dispersing device that achieves force dispersing effects.

Other objects and advantages of the invention may be further illustrated by the technical features broadly embodied and described as follows.

In order to achieve at least one or a portion of or all of the objects or other objects, one embodiment of the invention provides a force dispersing device for a display device. The display device has a casing, a backlight module and a display panel, the casing has a display opening, the backlight module is disposed in the display opening, and the display panel is disposed on the backlight module and in the display opening. The force dispersing device includes a fluid bag filled with a confined fluid and disposed between the casing and the backlight module.

In order to achieve at least one or a portion of or all of the objects or other objects, another embodiment of the invention provides a force dispersing device for dispersing a stress arisen from a stress concentration portion and imposed on at least one component inside a device. The force dispersing device includes a confined fluid pressing against the component to disperse the stress arisen from the stress concentration portion and imposed on the component. An area of the confined fluid is larger than a force exertion area on the component, and the stress concentration portion imposes the stress on the component via the force exertion area.

According to the above embodiments, since the same pressure change occurs everywhere in a confined fluid, the fluid bag disposed in a limited space is allowed to disperse the force applied thereon over a wider area to reduce the stress imposed on surrounding components. Besides, such arrangement may reduce the stress arisen from the stress concentration portion and imposed on components inside a device to prevent mechanical damage to the internal components. Further, the fluid bag is easy to adapt to different environments by changing its shape, thickness or distribution to function as a force dispersion structure flexible in use.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
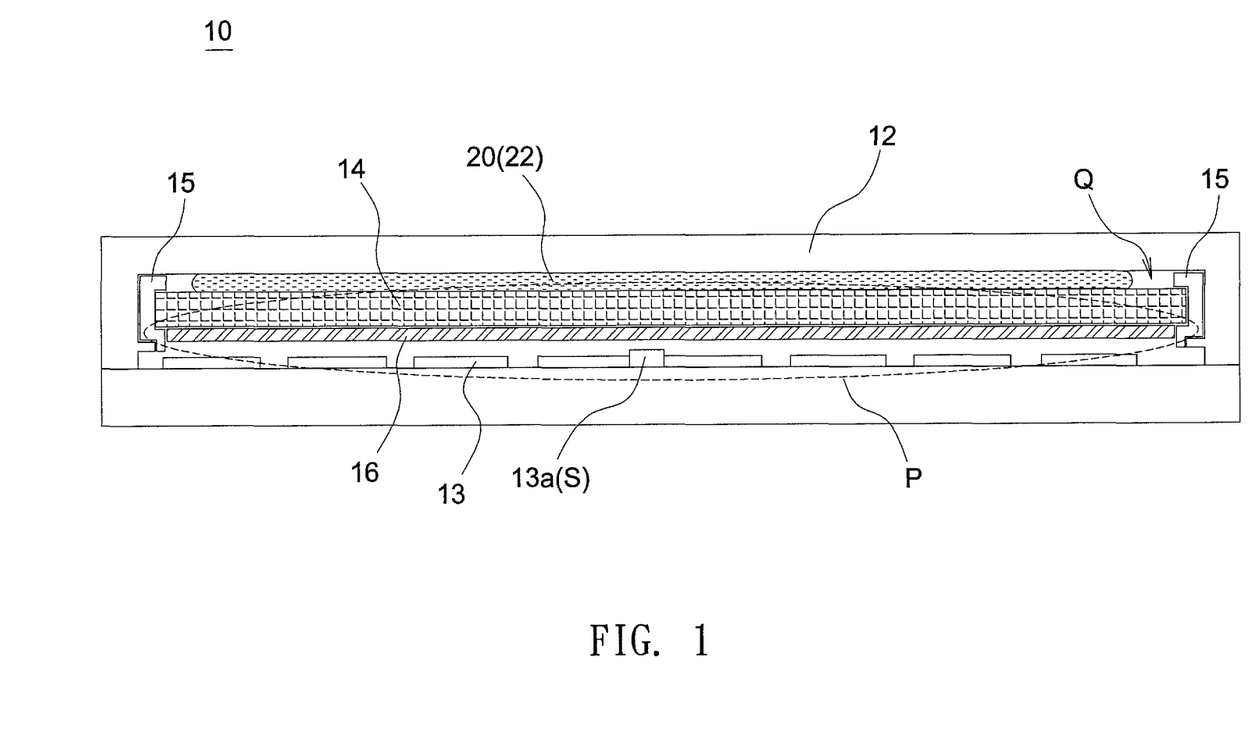
FIG. 1 shows a schematic cross-section of a display device having a force dispersing device according to an embodiment of the invention.

FIG. 1 shows a schematic cross-section of a display device having a force dispersing device according to an embodiment of the invention. The display device 10 may include, but is not limited to, a laptop computer, a display screen, or a tablet computer. As shown in FIG. 1, the display device 10 may include a casing (such as an A piece of a laptop computer) 12, a backlight module 14, a display panel 16 and a force dispersing device 20. In this embodiment, the casing 12 has a display opening P, the backlight module 14 is disposed in the display opening P, the display panel 16 is disposed on the backlight module 14 and in the display opening P, and the force dispersing device 20 is disposed between the casing 12 and the backlight module 14. Besides, the display device 10 may further include a frame 15, and the frame 15 is disposed on the casing 12, such as on a periphery of the display opening P. The display panel 16 and the backlight module 14 may be disposed on the frame 15. The frame 15 has a frame opening Q to form an accommodation space among the frame 15, the casing 12 and the backlight module 14. The force dispersing device 20 may be disposed in the frame opening Q (the accommodation space) and thus located between the casing 12 and the backlight module 14. Besides, in another embodiment, the frame 15 may have a bottom plate (not shown) without the frame opening Q, the backlight module 14 is located between the display panel 16 and the bottom plate of the frame 15, and the force dispersing device 20 is located between the casing 12 and the bottom plate of the frame 15.

Figure 2:
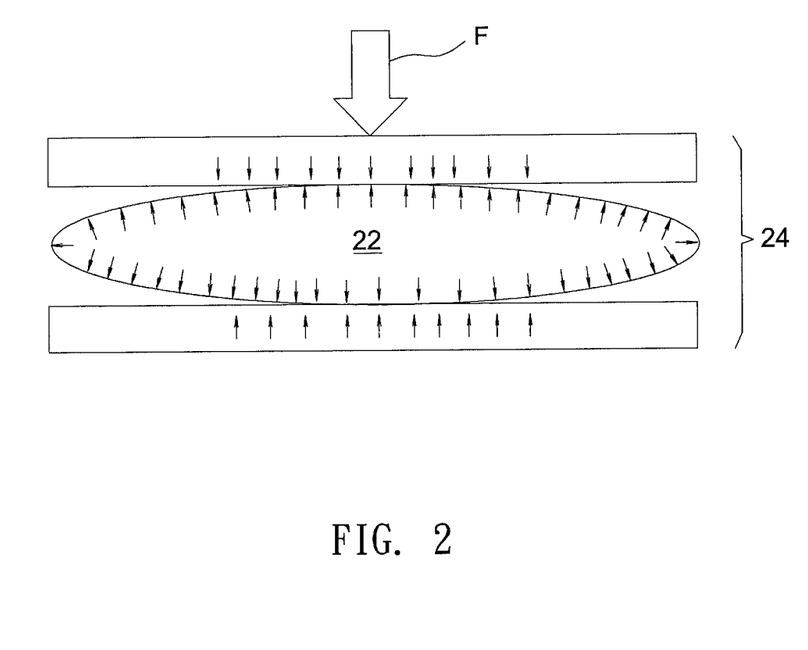
FIG. 2 shows a schematic diagram illustrating force dispersing effects of a fluid bag according to an embodiment of the invention.

In this embodiment, the force dispersing device 20 may include a fluid bag filled with a confined fluid, and the fluid bag 22 may be disposed between the casing 12 and the backlight module 14. The fluid confined in the fluid bag 22 may be, but not limited to, gas or liquid. FIG. 2 shows a schematic diagram illustrating force dispersing effects of a fluid bag according to an embodiment of the invention. As shown in FIG. 2, a fluid bag 22 is disposed inside an object 24. When a force F is applied on a small area of an object 24, the force F is transmitted to the fluid bag 22 and spread over a contact area between the fluid bag 22 and the object 24 according to Pascal's law, where a pressure change occurring anywhere in a confined fluid is transmitted throughout the fluid such that the same change occurs everywhere. As a result, a stress imposed on the object 24 is reduced because the force F is spread out over a comparatively larger area of the object 24. Therefore, in this embodiment, when the fluid bag 22 is disposed between the casing 12 and the backlight module 14, the fluid bag 22 may reduced a stress imposed on surrounding components, such as the casing 12, the backlight module 14 and the display panel 16. In one embodiment, the design of using the fluid bag 22 may reduce a gap between the casing 12 and the backlight module 14 to maintain a thickness of smaller than, for example, 0.6 mm.

Figure 3:
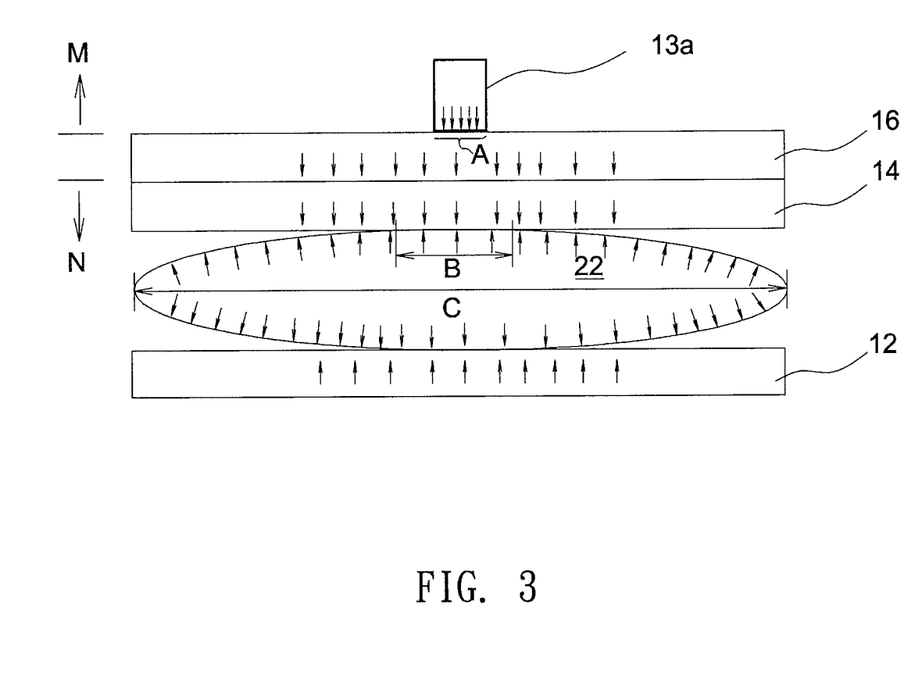
FIG. 3 shows a schematic diagram illustrating force dispersing effects of a fluid bag according to another embodiment of the invention.

Referring to FIG. 1 again, the display device 10 may further include a keyboard 13. The keyboard 13 may have a raised portion 13a formed by, for example, a control point S. Since the raised portion 13a may project from surrounding portions (such as the keyboard 13), the raised portion 13a is liable to become a stress concentration portion when a force exerts on the display device 10. For example, a finished product of a laptop computer needs to pass various tests, such as a back-pressure test that simulates a high pressure environment where the laptop computer is put in a backpack. During the back-pressure test, the raised portion 13a formed by the control point S and projecting from surrounding portions is liable to become a stress concentration portion. As a result, a part of the display panel 16 corresponding to the raised portion 13a is easy to be damaged because of the stress arising from the raised portion 13a. FIG. 3 shows a schematic diagram illustrating force dispersing effects of a fluid bag according to another embodiment of the invention. As shown in FIG. 3, a component such as the display panel 16 has a first side M and a second side N opposite the first side M, and a stress concentration portion such as the raised portion 13a is on the first side M and abuts against the display panel 16. The raised portion 13a forms a force exertion area A on the display panel 16, and the confined fluid in the fluid bag 22 may press against the display panel 16 via the second side N. Note the confined fluid inside the fluid bag 22 may press against a component in various ways. In this embodiment, the confined fluid in the fluid bag 22 may press against the display panel 16 via the backlight module 14, with the backlight module 14 being interposed between the fluid bag 22 with the confined fluid and the display panel 16. In another embodiment, the confined fluid may directly press against the display panel 16 without an intervening object, or the confined fluid may press against the display panel 16 via other element. Besides, the stress concentration portion may be formed by an object or an element outside a device, and the force dispersing effects are achieved as long as the object or the element may apply a force on a component inside the device. The confined fluid inside the fluid bag 22 overlaps the raised portion 13a, and an area of the confined fluid (such as an area B in contact with the second side N or a largest expansion area C of the confined fluid) is larger than the force exertion area A of the display panel 16 to which the stress arisen from the stress concentration portion (such as the raised portion 13a) is applied. Since the same pressure change occurs everywhere in a confined fluid, the fluid bag may disperse the force over the entire contact area between a component and the fluid bag 22 to reduce the considerable stress arisen from the stress concentration portion (such as the raised portion 13a) and imposed on the component (such as the display panel 16), thus preventing damages to the component in a device. Certainly, the fluid bag 22 is not limited to protect a specific component, such as the display panel 16 exemplified above, and may be used to protect other component such as the casing 12, the frame 15, or the backlight module 14. In another embodiment, the fluid bag 22 may be disposed in any selected position inside a device according to actual demands to reduce the stress arisen from the stress concentration portion and imposed on internal components.

Figure 4A:
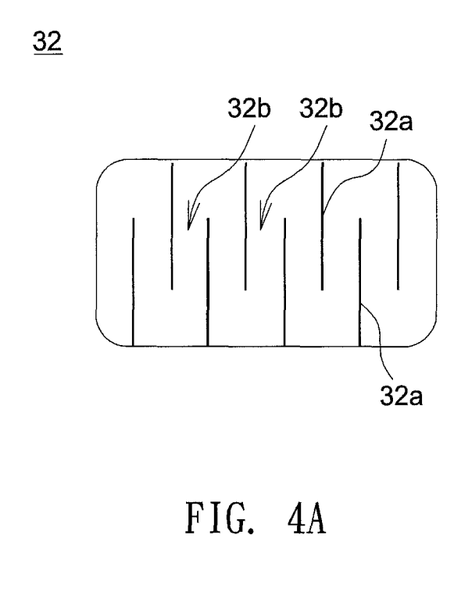
FIG. 4A and FIG. 4B respectively show a top view and a side view of a fluid bag according to another embodiment of the invention.
Figure 4B:
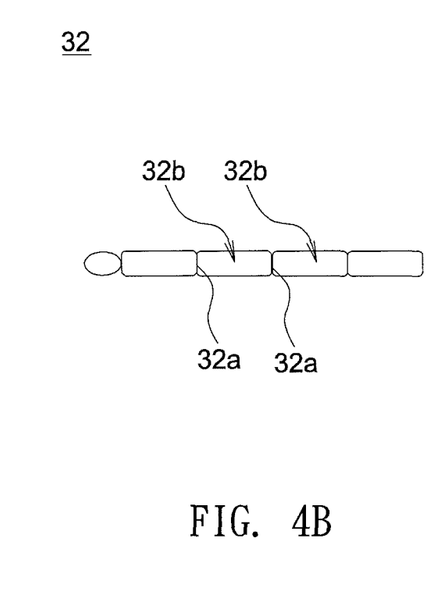
Figure 5:
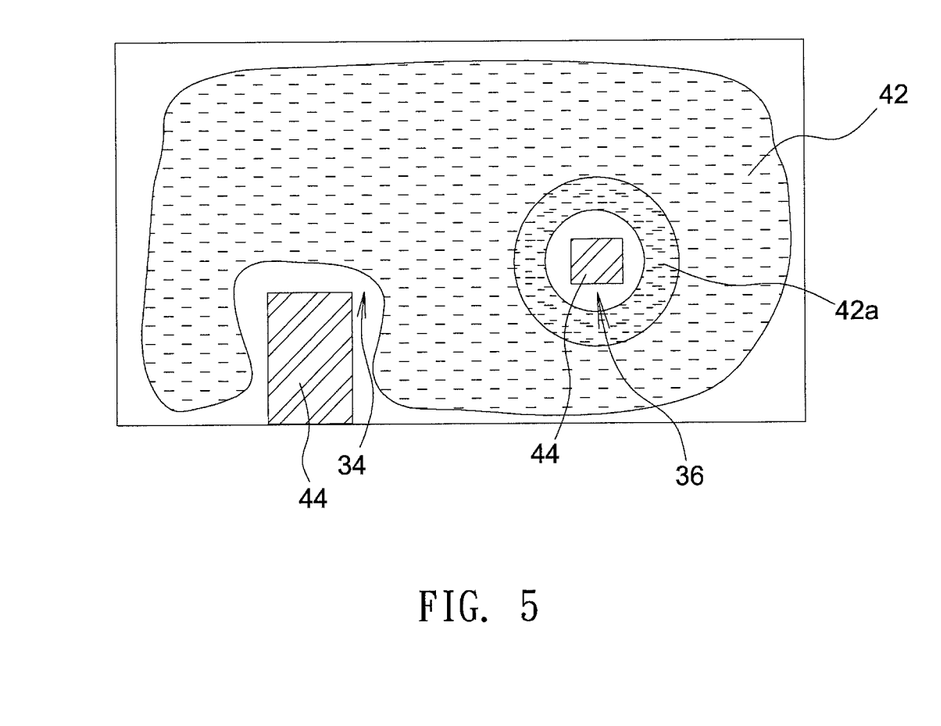
FIG. 5 shows a schematic diagram of a fluid bag according to another embodiment of the invention.

Note the fluid bag is not limited to a specific configuration. In one embodiment shown in FIG. 3, the fluid bag 22 is not provided with any separation structure. In another embodiment shown in FIG. 4A (top view) and FIG. 4B (side view), the fluid bag 32 may have at least one separation structure 32a to divide the fluid bag 32 into multiple partitions 32b. The partitions 32b may be connected with each other and may have an identical thickness or different thicknesses to locally adjust force distribution effects. Besides, the separation structure 32a of the fluid bag 32 may help to reduce a maximum thickness of the fluid bag 32 to decrease the overall thickness of a device and realize a slim profile. Further, the fluid bag may have different shapes to vary a maximum thickness of the fluid bag to provide various force dispersing effects. FIG. 5 shows a schematic diagram of a fluid bag according to another embodiment of the invention. In a slim and light product, some components may be fragile and need to be protected from external impacts. Therefore, as shown in FIG. 5, the fluid bag 42 may have at least one recess 34 or hole 36, and a device 44 needs to be protected is received in the recess 34 or hole 36 to resist external forces transferred from the fluid bag 42 and thus protect the device 44. Besides, an additional fluid bag 42a may be disposed around the device 44 to provide more room to shield the device 44. In one embodiment, the fluid bag 42 and the fluid bag 42a may have an identical fluid amount and fluid pressure. In another embodiment, the fluid bag 42 and the fluid bag 42a may have different fluid amounts and fluid pressures according to the type of the device 44. Besides, in one embodiment, a control device may be used to change a fluid amount and fluid pressure inside the fluid bag to suit various environments. For example, the control device may increase the fluid amount or pressure when the fluid bag suffers external shocks or impacts to protect important components. Further, in one embodiment, the fluid inside a fluid bag may have a high thermal conductivity to form a thermal loop and provide additional heat dissipating effects for the fluid bag.

The test results of sample products according to embodiments of the invention and conventional designs are shown in Table 1. The test conditions are described in the following. For example, an external force applied to each sample product is equal to 9 KGF, and a force dispersing device such as a fluid bag may be disposed between a backlight module and a casing (such as an A piece of a laptop computer). The casing is made of AL5052 type aluminum, and force sensors are disposed between a stress concentration portion (such as a raised portion of a keyboard) and a display panel. As shown in Table 1, a value of 3.1 KG measured by force sensors is obtained for the samples in Group 1 (without any force dispersion treatment) and Group 2 (rubber used as a buffer only), and a value of 2.4 KG measured by force sensors is obtained for the sample in Group 4 having a larger gap thickness between the backlight module and the casing. Besides, a value of 2.0 KG measured by force sensors is obtained for the sample in Group 3 where a fluid bag is disposed between the backlight module and the casing. Therefore, the design of using a fluid bag according an embodiment of the invention has enhanced force dispersing effects as compared with the design of increasing a gap between the backlight module and the casing. Further, it can be found, when comparing different gas amounts of fluid bags in Group 5, Group 6 and Group 7, a higher gas amount of a fluid bag may achieve better force dispersing effects.

TABLE 1

| Group | Sample | Value measured by force sensor (KG) |
| --- | --- | --- |
| 1 | AL 5052 | 3.1 |
| 2 | AL5052 (with a rubber) | 3.1 |

TABLE 1-continued

| Group | Sample | Value measured by force sensor (KG) |
| --- | --- | --- |
| 3 | AL 5052 (with a fluid bag) | 2.0 |
| 4 | AL 5052 (with an increased gap thickness of 0.9 mm) | 2.5 |
| 5 | AL 5052 (with an increased gap thickness of 0.9 mm and a fluid bag having a low gas amount) | 1.9 |
| 6 | AL 5052 (with an increased gap thickness of 0.9 mm and a fluid bag having a medium gas amount) | 1.5 |
| 7 | AL 5052 (with an increased gap thickness of 0.9 mm and a fluid bag having a high gas amount) | 1.15 |

According to the above embodiment, the force dispersing devices of the embodiments of the invention have at least one of the following advantages. Since the same pressure change occurs everywhere in a confined fluid, the fluid bag disposed in a limited space is allowed to disperse the force applied thereon over a wider area to reduce the stress imposed on surrounding components. Besides, such arrangement may reduce the stress arisen from the stress concentration portion and imposed on components inside a device to prevent mechanical damage to the internal components. Further, the fluid bag is easy to adapt to different environments by changing its shape, thickness or distribution to function as a force dispersion structure flexible in use.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A force dispersing device for a display device, the display device having a casing, a backlight module and a display panel, the casing having a display opening, the backlight module being disposed in the display opening, the display panel being disposed on the backlight module and in the display opening, and the force dispersing device comprising:
   a fluid bag, filled with a confined fluid and disposed between the casing and the backlight module.

2. The force dispersing device as claimed in claim 1, wherein the display device further comprises a keyboard, the keyboard has a raised portion, and the fluid bag overlaps the raised portion.

3. The force dispersing device as claimed in claim 1, wherein the fluid bag has at least one separation structure to divide the fluid bag into multiple partitions.

4. The force dispersing device as claimed in claim 1, wherein the fluid bag has at least one recess or hole.

5. The force dispersing device as claimed in claim 1, wherein a gap between the casing and the backlight module has a thickness of smaller than 0.6 mm.

6. The force dispersing device as claimed in claim 1, wherein the display device further comprises a frame, the frame is disposed on a periphery of the display opening, and the display panel and the backlight module are disposed on the frame.

7. A force dispersing device for dispersing a stress arisen from a stress concentration portion and imposed on at least one component inside a device, the force dispersing device comprising:
   a confined fluid, pressing against the component to disperse the stress arisen from the stress concentration portion and imposed on the component, an area of the confined fluid being larger than a force exertion area on the component, and the stress concentration portion imposing the stress on the component via the force exertion area, wherein the stress concentration portion is a raised portion inside the device and the raised portion abuts against the component.

8. The force dispersing device as claimed in claim 7, wherein the component has a first side and a second side opposite the first side, the stress concentration portion is on the first side, and the confined fluid presses against the component via the second side.

9. The force dispersing device as claimed in claim 7, wherein the component is a display panel, and the confined fluid presses against the display panel via a backlight module interposed between the confined fluid and the display panel.

10. The force dispersing device as claimed in claim 7, wherein the device is a display device, and the component is a casing, a frame, a backlight module or a display panel of the display device.

* * * * *